US012585823B2

(12) United States Patent
Lee

(10) Patent No.: US 12,585,823 B2
(45) Date of Patent: Mar. 24, 2026

(54) SYSTEMS AND METHODS FOR FACILITATING PRIVACY DISCLOSURE AND CONSENT

(71) Applicant: Eric Y Lee, Los Altos, CA (US)

(72) Inventor: Eric Y Lee, Los Altos, CA (US)

( * ) Notice: Subject to any disclaimer, the term of this patent is extended or adjusted under 35 U.S.C. 154(b) by 13 days.

(21) Appl. No.: 18/717,289

(22) PCT Filed: Dec. 7, 2022

(86) PCT No.: PCT/US2022/052156
§ 371 (c)(1),
(2) Date: Aug. 7, 2024

(87) PCT Pub. No.: WO2023/107572
PCT Pub. Date: Jun. 15, 2023

(65) Prior Publication Data
US 2025/0013787 A1 Jan. 9, 2025

Related U.S. Application Data

(60) Provisional application No. 63/286,962, filed on Dec. 7, 2021.

(51) Int. Cl.
*G06F 21/62* (2013.01)

(52) U.S. Cl.
CPC ................................ *G06F 21/6263* (2013.01)

(58) Field of Classification Search
CPC .......................... G06F 21/6263; H04L 63/0281
See application file for complete search history.

(56) References Cited

U.S. PATENT DOCUMENTS

| | | | |
|---|---|---|---|
| 10,581,921 B1 * | 3/2020 | Ahn .................... | G06F 21/6263 |
| 11,526,629 B2 * | 12/2022 | Shinde .................... | H04L 63/30 |
| 11,704,439 B2 * | 7/2023 | Bonat .................... | H04L 63/20 |
| | | | 726/26 |
| 2006/0075122 A1 * | 4/2006 | Lindskog ............ | H04L 63/0823 |
| | | | 709/228 |

* cited by examiner

*Primary Examiner* — Amie C. Lin
(74) *Attorney, Agent, or Firm* — Edward B. Weller

(57) ABSTRACT

A method includes intercepting a service request from an end user to a service provider; retrieving, from a storage, a list of user preferences of the end user for privacy and disclosure on a communication network; providing the service request of the end user and the list of user preferences to the service provider if the service provider is to process the user preferences; receiving a service response acknowledging the acceptance or rejection of the user preferences or a disclosure manifest or both if the service provider processes the user preferences; receiving the disclosure manifest if the service provider does not process the user preferences; validating the user preferences and the disclosure manifest; and providing, to the end user, the service response, actions taken based on the validation and the acknowledgement.

21 Claims, 7 Drawing Sheets

100

SYSTEMS AND METHODS FOR FACILITATING PRIVACY DISCLOSURE AND CONSENT

RELATED APPLICATION

This application claims the benefit under 35 USC § 119 to U.S. provisional patent application Ser. No. 63/286,962 filed on Dec. 7, 2022, which is incorporated by reference herein in its entirety.

BACKGROUND

The disclosure relates to systems and methods for facilitating privacy disclosure and consent, and, in particular, to systems and methods for facilitating privacy disclosure and consent with service providers.

Unless otherwise indicated herein, the approaches described in this section are not admitted to be prior art by inclusion in this section.

A website provider may ask a user to select privacy settings that control the information the website collects about the user and how the website provider uses the information. Often the questions about privacy settings are controlled by law, such as California Consumer Privacy Act (CCPA), and regulation, such as General Data Protection Regulation (EU) 2016/679 (GDPR). Each website provider may ask the user to select privacy settings. Often, the privacy settings of the browser of the user may block a website from remembering that the user has previously accessed the website. In such instances, the website provider may ask the user to select the privacy setting every new session of the user at the website.

Some designers of websites may be unaware of privacy laws and regulations or how to set or use cookies.

What is desired is a system and method for facilitating privacy disclosure and consent with service providers.

SUMMARY

The present disclosure provides for systems and methods for facilitating privacy disclosure and consent. In one embodiment, a method comprises intercepting a service request from an end user to a service provider; retrieving, from a storage, a list of user preferences of the end user for privacy and disclosure on a communication network; providing the service request of the end user and the list of user preferences to the service provider if the service provider is to process the user preferences; receiving a service response acknowledging the acceptance or rejection of the user preferences or a disclosure manifest or both if the service provider processes the user preferences; receiving the disclosure manifest if the service provider does not process the user preferences; validating the user preferences and the disclosure manifest; and providing, to the end user, the service response, actions taken based on the validation and the acknowledgement.

In one embodiment, the method further comprises retrieving, from the storage, a list of organization preferences of an organization associated with the end user for privacy and disclosure on the communication network; and providing the list of organization preferences to the service provider. The service response acknowledging the acceptance or rejection of the user preferences or a disclosure manifest or both includes acknowledging the acceptance or rejection of the organization preferences. Validating the user preferences and the disclosure manifest includes validating the organization preferences.

In one embodiment, the list of user preferences is based on preferences of a group of other end users for privacy and disclosure on the communication network and selected by the end user.

In one embodiment, the list of user preferences includes cookie preferences, The disclosure manifest includes cookie requirements of the service provider. Validating the user preferences and the disclosure manifest includes enforcing the user preferences based on the cookie requirements of the end user and the cookie requirements of the service provider.

In one embodiment, the list of user preferences includes cookie preferences of the end user. The list of organization preferences includes cookie preferences of the organization. The disclosure manifest includes cookie requirements of the service provider. Validating the user preferences and the disclosure manifest includes enforcing the user preferences based on the cookie requirements of the end user, the cookie requirements of the organization, and the cookie requirements of the service provider.

In one embodiment the list of user preferences includes cookie preferences of the end user. The list of group preferences includes cookie preferences of the other group. The disclosure manifest includes cookie requirements of the service provider. Validating the user preferences and the disclosure manifest includes enforcing the user preferences based on the cookie requirements of the end user, the cookie requirements of the other group, and the cookie requirements of the service provider.

The disclosure provides for a method for providing a user agent. In one embodiment, the method comprises receiving, by a service provider, a service request from an end user; and providing, by the service provider, a service response, a disclosure manifest, and a request for the end user to a download of a user agent to a system of the end user, the user agent controlling user preferences for privacy and disclosure on a communication network.

In one embodiment, the method further comprises receiving, by the service provider, authorization from the end user to download the user agent; and providing the user agent to the system of the end user for installation thereof.

The disclosure provides for a system comprising a memory storing computer-executable instructions and a processor executing the computer-executable instructions to perform any of the methods and processes described herein.

The disclosure provides for a non-transitory computer readable storage medium comprising instructions, that, when executed, cause an application to perform any of the methods and processes described herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Various embodiments of the present invention are now described with reference to the figures where like reference numbers indicate identical or functionally similar elements. Also in the figures, the left most digits of each reference number corresponds to the figure in which the reference number is first used.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

The disclosure provides for a user agent that serves as a proxy for an end user for interacting with service providers by controlling and managing privacy and content preferences of the end user. The end user sets the preferences, and the user agent intercepts service requests from the end user and communicates with service providers based on the user preferences. The end user no longer needs to sets privacy sets for services providers that were previously accessed or are accessed for the first time. The user agent arbitrates when the user preferences differ from the preferences of the service provider.

Figure 1:
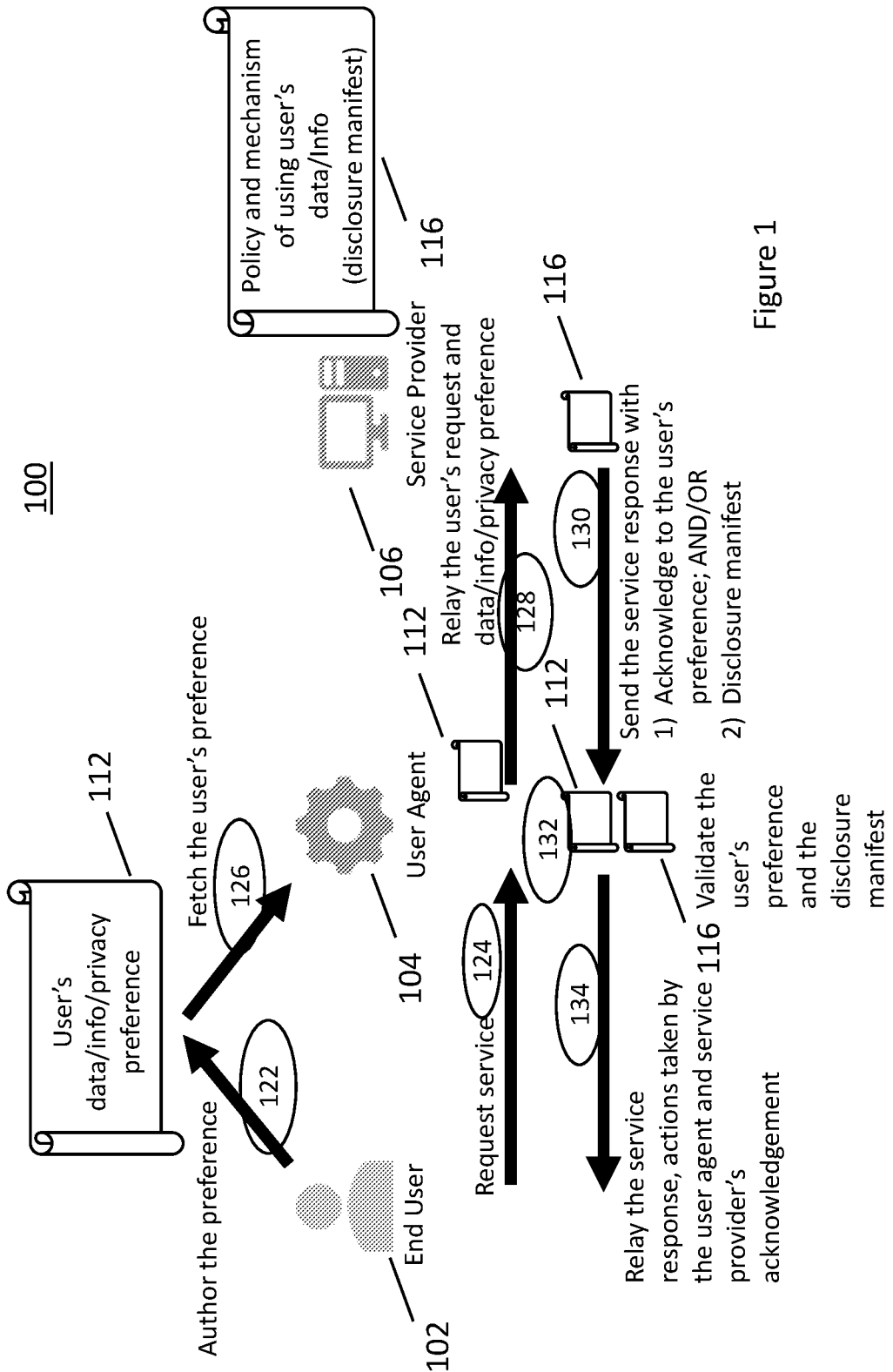
FIG. 1 is a block diagram illustrating a non-cookie privacy control system according to one embodiment.

FIG. 1 is a block diagram illustrating a non-cookie privacy control system 100 according to one embodiment. The non-cookie privacy control system 100 may be used for scenarios that do not rely on cookie or communication headers to facilitate the data/information tagging/tracking purpose. The privacy control system 100 comprises an end user system 102, a user agent 104, and a plurality of service providers 106. The end user system 102 may be, for example, a browser on a computer, table, or mobile device. The end user system 100 provides a platform for an end user 102 to communicate over a communication network, such as the internet. For simplicity and clarity, "end user 102" may be used interchangeably with "end user system 102." For simplicity and clarity, only one service provider 106 is shown.

The end user 102 has identity attributes, such as personally identifiable information (PII). The end user 102 may have implicit or explicit membership attributes, such as membership in an organization, sexual orientation, political affiliation, religion, medical condition, and disease. The end user 102 may have sensitive information that the end user 102 wants to limit access to.

The user agent 104 is software that acts on behalf of the end user 102 and facilitates end user interaction with web content. The user agent 104 may include a consent proxy that is a special user agent acting on behalf of the end user 102 and the service provider 106 to exchange the service provider's disclosure of data, information use and mechanism and the end user's data and information use preferences. The consent proxy may enforce the user's preference on behalf of both the end user 102 and the service provider 106.

The service provider 106 provides content or services to the end user 102. The service providers 106 may be websites, web applications, web API, or service endpoints, and/or content providers. The service providers 106 include the organizations and their supply chain vendors that together produce the content in response to users' requests to a URI (Uniform Resource Identifier) where the service/service context can be allocated. The service provider 106 may be, for example, an individual website, a content delivery service, such as a video platform (e.g., YouTube), a search engine (e.g., Google), or a social media platform (e.g., Facebook), or an ad outlet. The end user 102 may set privacy preferences based on the type of website. The types of service may include, for example, news websites, financial institutions, government agencies, and shopping websites. Preference can be set for different types/categories of websites or specific websites. Preference can be specified as Allow, Decline or some degree in between.

The end user 102 sets, at 122, user preferences 112, which may be stored on the user's device or platform in a computer readable storage medium. For simplicity and clarity, the user preferences 112 are also referred to herein as "user preferences list 112." The user preferences 112 relate to the data, information and privacy preferences of the end user 102. The user preferences 112 may relate to disclosure of data (e.g., do not sell or share data), information use, and disclosure of information (e.g., do not sell or share information). The user preferences 112 may include cookie usage. The cookie types may be, for example, strictly necessary, functional/preference, performance/stats, and marketing). Cookies are blocks of data created by the service provider 106 while the user is browsing a website and placed on the user's computer or other device by the user's web browser. "Cookie" includes any persistent or transient data that is initially set and put into users' device by the service provider 106 and later send back to the service provider 106 by the users' device.

The user agent 104 intercepts, at 124, a service request from the end user 102 to the service provider 106. In response to the service request, the user agent 104 retrieves, at 126, from a storage, the list 112 of user preferences of the end user 102 for privacy and disclosure on a communication network. The user agent 104 provides, at 128, the service request of the end user 102 and the user preferences list 112 to the service provider 106 if the service provider 106 is to process the user preferences. In this case, the service provider 106 processes the user preferences and determines whether to accept or reject the user preferences. The service provider 106 provides, at 130, to the user agent 104 a service response acknowledging the acceptance or rejection of the user preferences or a disclosure manifest 116 or both if the service provider 106 processes the user preferences. The service provider 106 provides, at 130, to the user agent 104 the disclosure manifest 116 if the service provider 106 does not process the user preferences. The user agent 104 validates, at 132, the user preferences 112 and the disclosure manifest 116. The user agent 104 provides, at 134, to the end user 102 the service response of the service provider 106, actions taken by the user agent 104 based on the validation, and the acknowledgement of the service provider 106.

Figure 2:
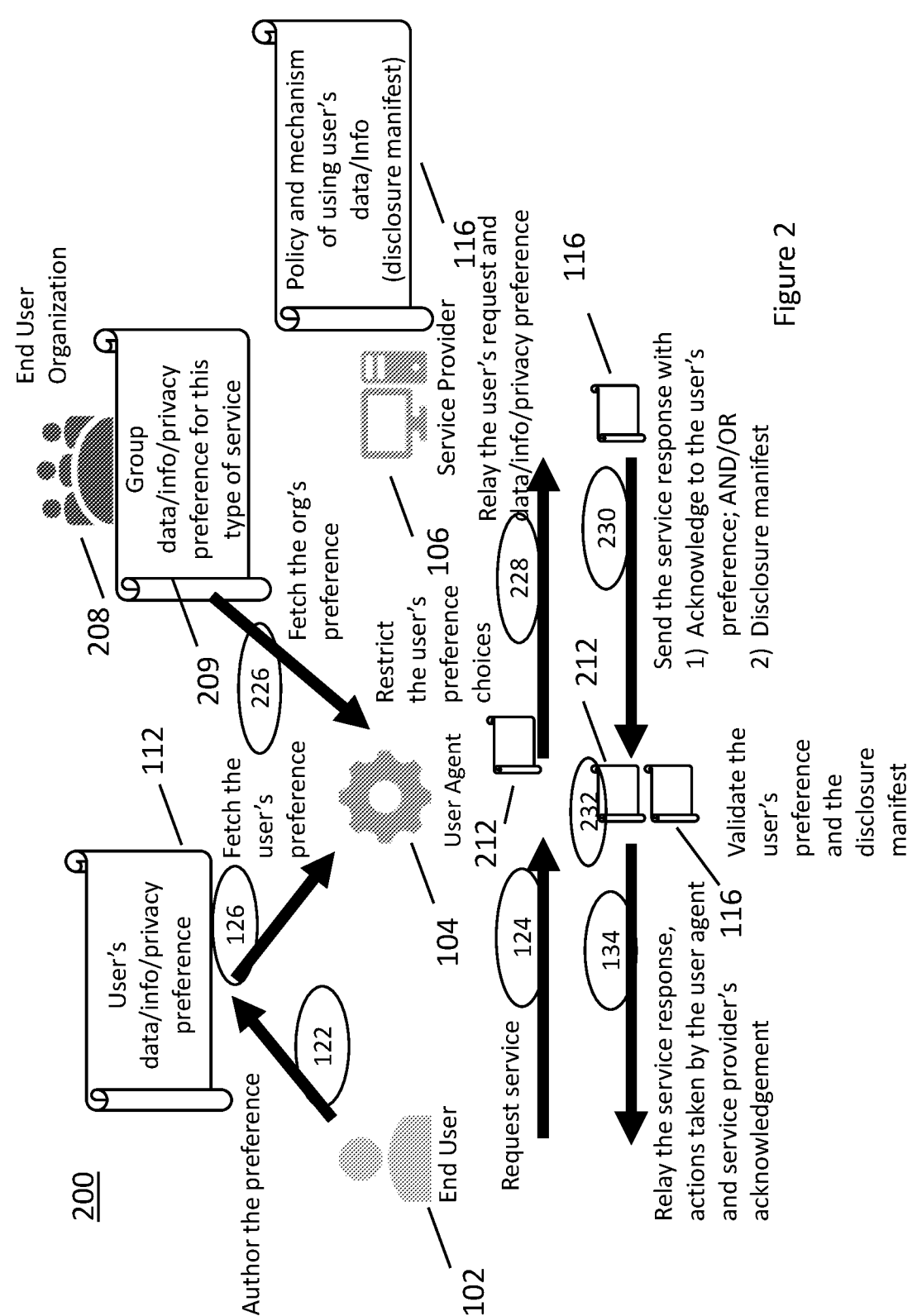
FIG. 2 is a block diagram illustrating a non-cookie privacy control system according to one embodiment.

FIG. 2 is a block diagram illustrating a non-cookie privacy control system 200 according to one embodiment. The privacy control system 200 is similar to the privacy control system 100 that comprises the end user system 102, the user agent 104 and the service provider 106, and further comprises an end user organization 208.

The end user organization 208 is an entity or group with which the end user 102 is associated. In various embodiments, the end user organization 208 is a household, an employer, such as a company or a government, or a temporary group to which the end user 102 belong. The temporary group may be a group or entity that provides internet connection through their router. The temporary group may be a location where the end user 102 is confined in a space for a short time. The temporary group may be, for example, a club, hotel, conference, transportation, a food establishment, a shopping location, a clinic, a hospital, government or military offices, or a service provider.

In various embodiments, the end user organization 208 sets the end user preferences for communication through the network and servers of the end user organization 208. For example, an end user 102 that accesses the internet through the server of their employer is bound by the end user preferences of the end user organization 208, but when the end user 102 accesses the internet through their home server, the end user preferences control, unless the end user 102 belongs to an end user organization 208 that is a household where another member of the household controls preferences of the home router.

The end user organization 208 provides organization preferences for privacy and disclosure that may supplement or supersede the user preferences of the end user 102.

The end user 102 sets, at 122, user preferences 112, which may be stored on the user's device or platform in a computer readable storage medium. The user agent 104 intercepts, at 124, a service request from the end user 102 to the service provider 106. In response to the service request, the user agent 104 retrieves, at 126, from a storage, the list 112 of user preferences of the end user 102 for privacy and disclosure on a communication network. In response to the service request, the user agent 104 also retrieves, at 226, from the storage, a list 209 of organization preferences of an organization 208 associated with the end user 104 for privacy and disclosure on the communication network. The organization preferences 209 relate to the data, information and privacy preferences of the end user organization 208. The organization preferences 209 may relate to disclosure of data (e.g., do not sell or share data), information use, and disclosure of information (e.g., do not sell or share information). The organization preferences 209 may include cookie usage. The cookie types may be, for example, strictly necessary, functional/preference, performance/stats, and marketing). The organization preferences 209 may also indicate preference for different types of websites or specific websites or both.

The user agent 104 restricts the user preferences 112 based on the organization preferences 209 to generate a user preferences list 212 (also references to herein as "user preferences 212"). The user agent 104 provides, at 228, the service request of the end user 102 and the user preferences list 212 to the service provider 106 if the service provider 106 is to process the user preferences 212. In this case, the service provider 106 processes the user preferences 212 and determines whether to accept or reject the user preferences. The user preferences 212 is the user preferences 112 modified by the organization preferences 209. The service provider 106 provides, at 230, to the user agent 104 a service response acknowledging the acceptance or rejection of the user preferences 212 or a disclosure manifest 116 or both if the service provider 106 processes the user preferences 212. The service provider 106 provides, at 230, to the user agent 104 the disclosure manifest 116 if the service provider 106 does not process the user preferences 212. The user agent 104 validates, at 232, the user preferences 212 and the disclosure manifest 116. The user agent 104 provides, at 134, to the end user 102 the service response of the service provider 106, actions taken by the user agent 104 based on the validation, and the acknowledgement of the service provider 106.

Figure 3:
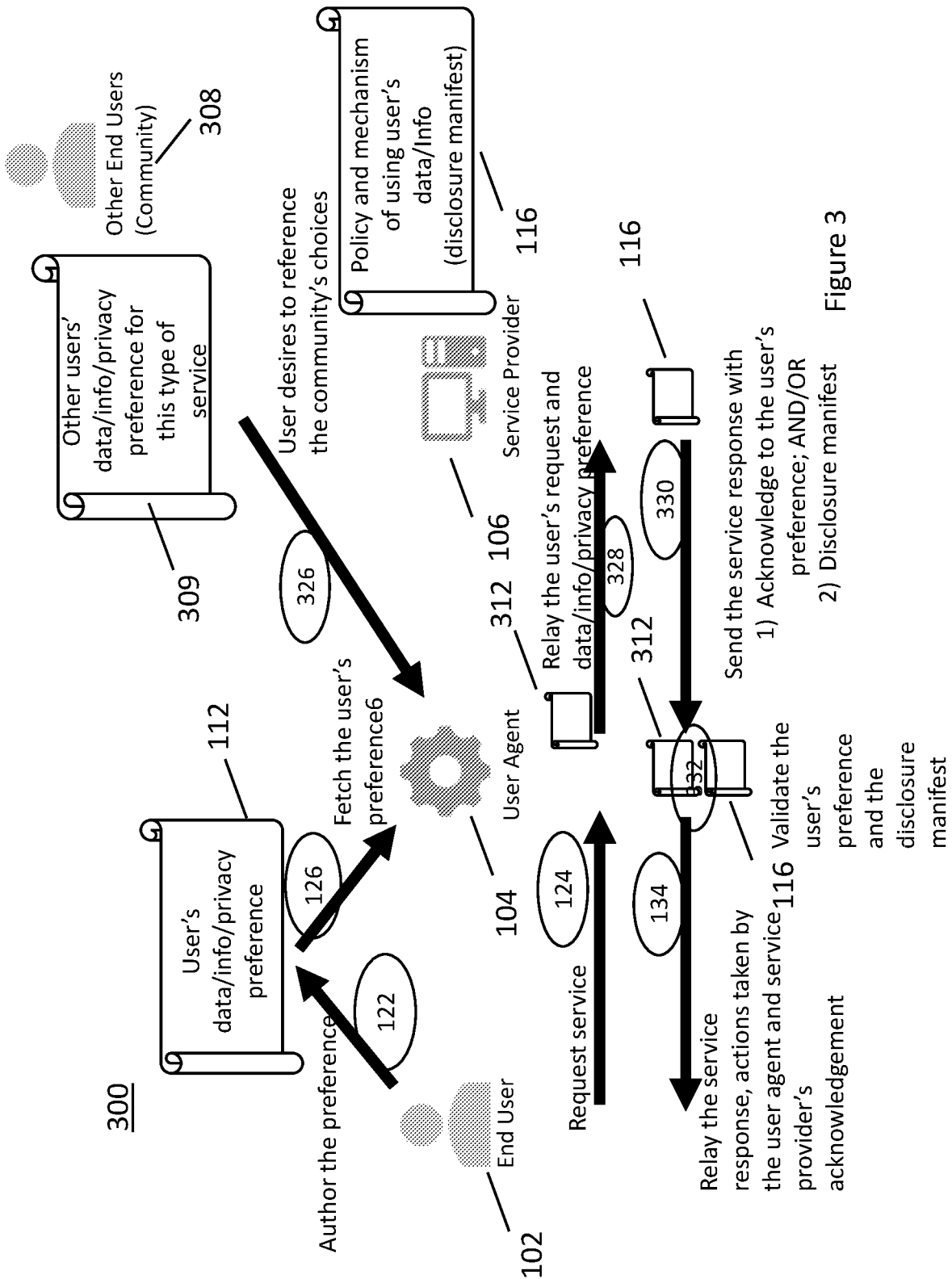
FIG. 3 is a block diagram illustrating a non-cookie privacy control system according to one embodiment.

FIG. 3 is a block diagram illustrating a non-cookie privacy control system 300 according to one embodiment. The privacy control system 300 is similar to the privacy control system 100 that comprises the end user system 102, the user agent 104 and the service provider 106, and further comprises a community 308 of other end users.

The community 308 of other end users are other end users associated with or acknowledged by the end user 102. In various embodiments, the community 308 of other end users may be a group of which the end user 102 is a member of a temporary group to which the end user 102 belongs. The community 308 differs from the organization 208 in that the community 308 does not dictate the preferences of the service to the end user 102, but rather sets their own preferences. The end user 102 decides to accept some or all of these preferences as preferences of the end user 102.

The end user 102 sets, at 122, user preferences 112, which may be stored on the user's device or platform in a computer readable storage medium. The user agent 104 intercepts, at 124, a service request from the end user 102 to the service provider 106. In response to the service request, the user agent 104 retrieves, at 126, from a storage, the list 112 of user preferences of the end user 102 for privacy and disclosure on a communication network. In response to the service request, the user agent 104 also retrieves, at 326, from the storage, a list 309 of group preferences of the community 308 associated with the end user 104 for privacy and disclosure on the communication network. The community preferences 309 relate to the data, information and privacy preferences of the community 308. The community preferences 309 may relate to disclosure of data (e.g., do not sell or share data), information use, and disclosure of information (e.g., do not sell or share information). The community preferences 309 may include cookie usage. The cookie types may be, for example, strictly necessary, functional/preference, performance/stats, and marketing).

The user agent 104 modifies the user preferences 112 based on the community preferences 309 to generate a user preferences list 312 (also references to herein as "user preferences 312"). The user agent 104 provides, at 328, the service request of the end user 102 and the user preferences list 312 to the service provider 106 if the service provider 106 is to process the user preferences 312. In this case, the service provider 106 processes the user preferences 312 and determines whether to accept or reject the user preferences. The user preferences 312 is the user preferences 112 modified by the community preferences 309. The user agent 104 may randomly select preferences for each service request based on probabilities from the user preferences 112 so that the servicer provider 106 has difficulty determining the real preferences or identity of the end user 102. The service provider 106 provides, at 330, to the user agent 104 a service response acknowledging the acceptance or rejection of the user preferences 312 or a disclosure manifest 116 or both if the service provider 106 processes the user preferences 312. The service provider 106 provides, at 330, to the user agent 104 the disclosure manifest 116 if the service provider 106 does not process the user preferences 312. The user agent 104 validates, at 332, the user preferences 312 and the disclosure manifest 116. The user agent 104 provides, at

134, to the end user 102 the service response of the service provider 106, actions taken by the user agent 104 based on the validation, and the acknowledgement of the service provider 106.

Figure 4:
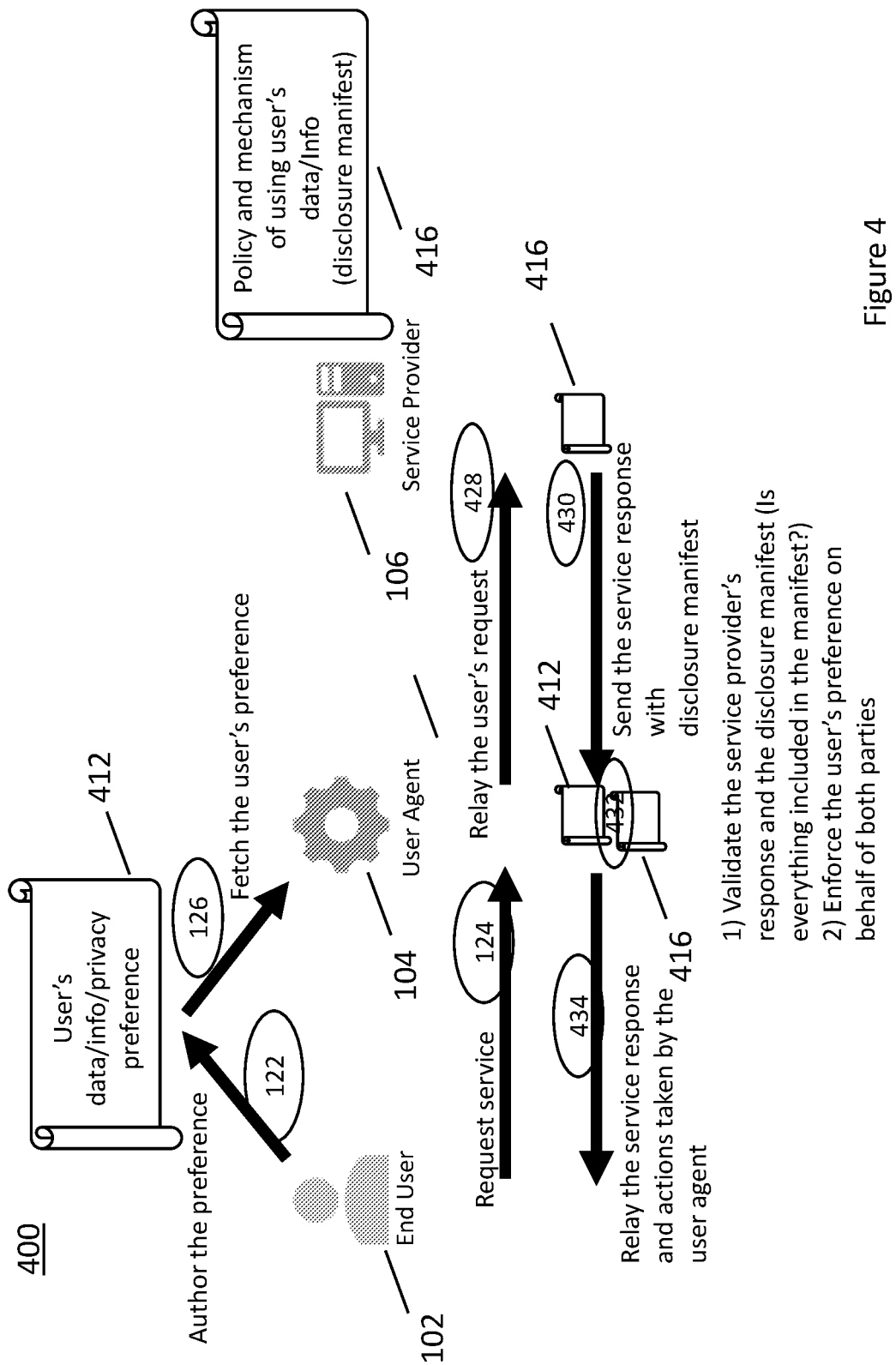
FIG. 4 is a block diagram illustrating a cookie privacy control system according to one embodiment.

FIG. 4 is a block diagram illustrating a cookie privacy control system 400 according to one embodiment. The cookie privacy control system 400 may be used for scenarios that rely on cookie or communication headers to facilitate the data/information tagging/tracking purpose. The privacy control system 400 comprises an end user system 102, a user agent 104, and a plurality of service providers 106. For simplicity and clarity, only one service provider 106 is shown.

The end user 102 sets, at 122, user preferences 412, which may be stored on the user's device or platform in a computer readable storage medium. For simplicity and clarity, the user preferences 412 are also referred to herein as "user preferences list 412." The user preferences 412 are similar to user preferences 112 but include cookie usage. The cookie types may be, for example, strictly necessary, functional/preference, performance/stats, and marketing).

The user agent 104 intercepts, at 124, a service request from the end user 102 to the service provider 106. In response to the service request, the user agent 104 retrieves, at 126, from a storage, the list 412 of user preferences of the end user 102 for privacy and disclosure on a communication network. The user agent 104 provides, at 428, the service request of the end user 102 and the user preferences list 412 to the service provider 106 if the service provider 106 is to process the user preferences 412. In this case, the service provider 106 processes the user preferences and determines whether to accept or reject the user preferences 412. The service provider 106 provides, at 430, to the user agent 104 a service response acknowledging the acceptance or rejection of the user preferences or a disclosure manifest 416 or both if the service provider 106 processes the user preferences. The disclosure manifest 416 is similar to the disclosure manifest 116 but also includes cookie requirements of the service provider 106. The service provider 106 provides, at 430, to the user agent 104 the disclosure manifest 416 if the service provider 106 does not process the user preferences. The user agent 104 validates, at 432, the user preferences 112 and the disclosure manifest 416. The user agent 104 validates by also enforcing the user preferences 412 based on the cookie requirements of the end user 102 and the cookie requirements of the service provider 106. The user agent 104 provides, at 434, to the end user 102 the service response of the service provider 106, actions taken by the user agent 104 based on the validation, and the acknowledgement of the service provider 106.

Figure 5:
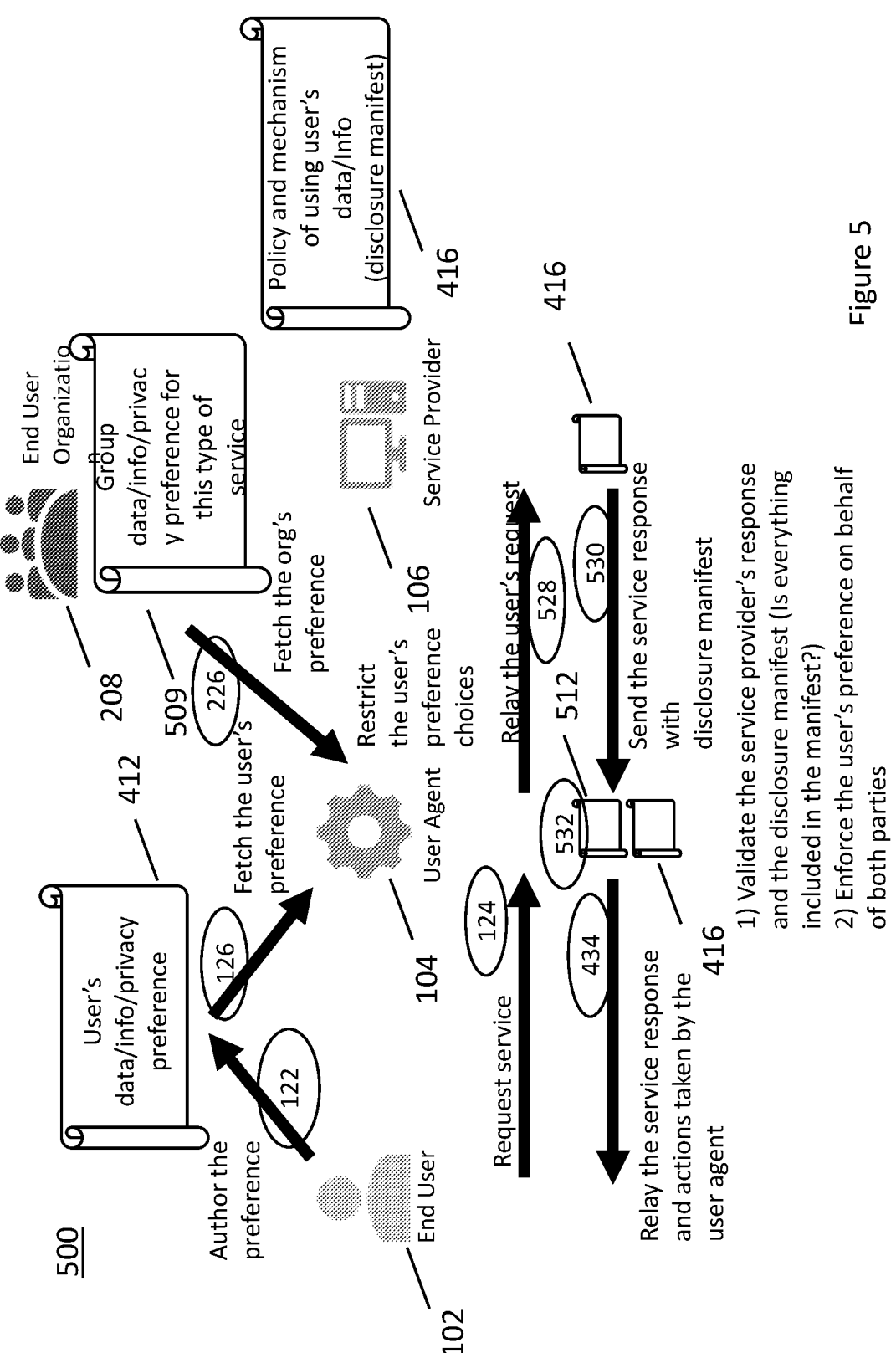
FIG. 5 is a block diagram illustrating a cookie privacy control system according to one embodiment.

FIG. 5 is a block diagram illustrating a cookie privacy control system 500 according to one embodiment. The privacy control system 500 is similar to the privacy control system 400 that comprises the end user system 102, the user agent 104 and the service provider 106, and further comprises an end user organization 208.

In various embodiments, the end user organization 208 sets the end user preferences 509 for communication through the network and servers of the end user organization 208. For example, an end user 102 that accesses the internet through the server of their employer is bound by the end user preferences of the end user organization 208, but when the end user 102 accesses the internet through their home server, the end user preferences control, unless the end user 102 belongs to an end user organization 208 that is a household where another member of the household controls preferences of the home router.

The end user organization 208 provides organization preferences 509 for privacy and disclosure that may supplement or supersede the user preferences of the end user 102. The organization preferences 509 are similar to the organization preferences 209 but include cookie usage.

The end user 102 sets, at 122, user preferences 412, which may be stored on the user's device or platform in a computer readable storage medium. The user agent 104 intercepts, at 124, a service request from the end user 102 to the service provider 106. In response to the service request, the user agent 104 retrieves, at 126, from a storage, the list 412 of user preferences of the end user 102 for privacy and disclosure on a communication network. In response to the service request, the user agent 104 also retrieves, at 226, from the storage, the organization preferences 509 of the organization 208 associated with the end user 104 for privacy and disclosure on the communication network.

The user agent 104 restricts the user preferences 412 based on the organization preferences 509 to generate a user preferences list 512 (also references to herein as "user preferences 512"). The user agent 104 provides, at 528, the service request of the end user 102 and the user preferences list 512 to the service provider 106 if the service provider 106 is to process the user preferences 512. In this case, the service provider 106 processes the user preferences 512 and determines whether to accept or reject the user preferences. The user preferences 512 is the user preferences 412 modified by the organization preferences 509. The service provider 106 provides, at 530, to the user agent 104 a service response acknowledging the acceptance or rejection of the user preferences 512 or a disclosure manifest 416 or both if the service provider 106 processes the user preferences 512. The service provider 106 provides, at 530, to the user agent 104 the disclosure manifest 416 if the service provider 106 does not process the user preferences 512. The user agent 104 validates, at 532, the user preferences 512 and the disclosure manifest 416. The user agent 104 validates by also enforcing the user preferences 412 based on the cookie requirements of the end user 102 and the cookie requirements of the service provider 106. The user agent 104 provides, at 434, to the end user 102 the service response of the service provider 106, actions taken by the user agent 104 based on the validation, and the acknowledgement of the service provider 106.

Figure 6:
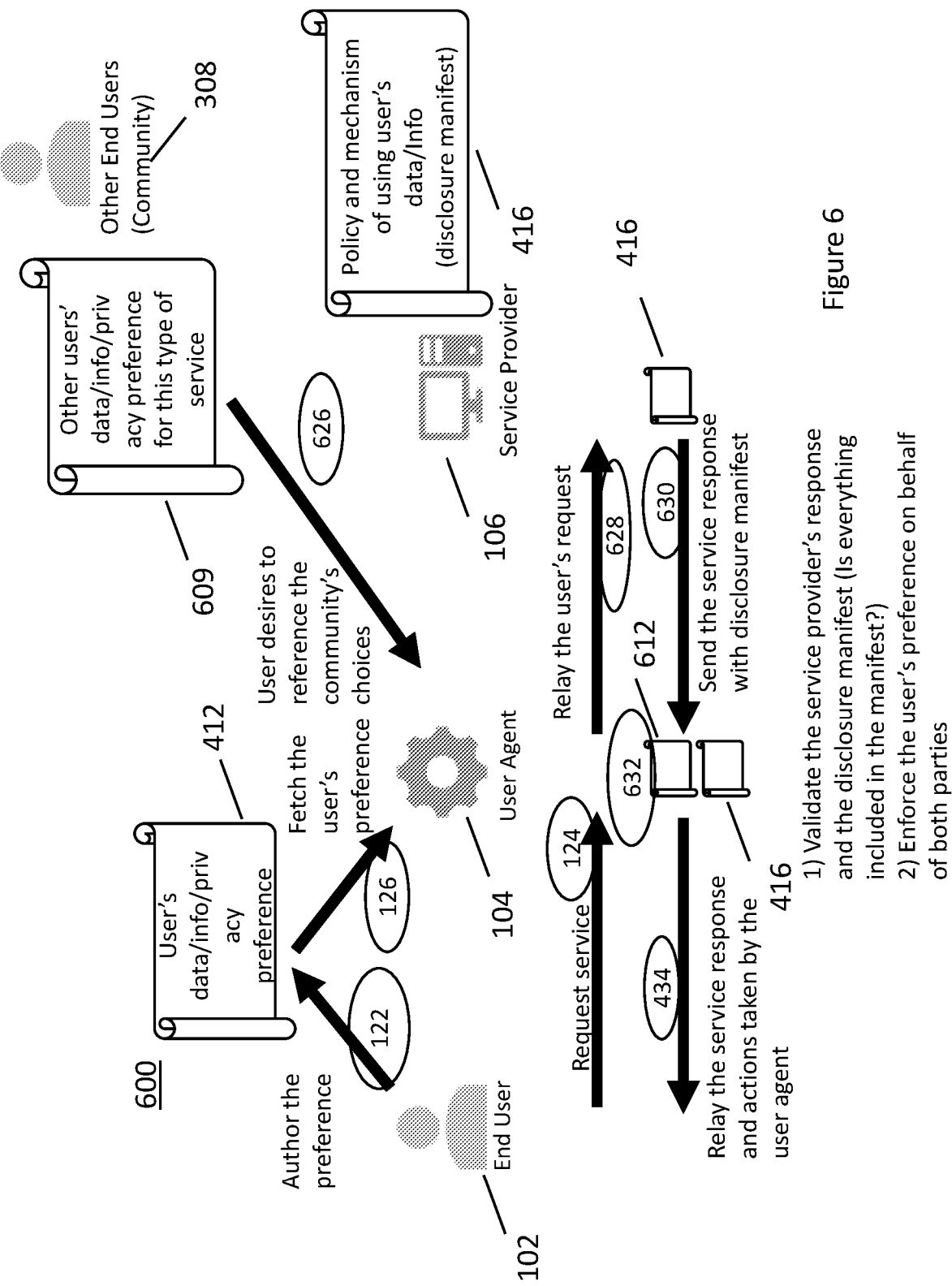
FIG. 6 is a block diagram illustrating a cookie privacy control system according to one embodiment.

FIG. 6 is a block diagram illustrating a cookie privacy control system 600 according to one embodiment. The privacy control system 600 is similar to the privacy control system 400 that comprises the end user system 102, the user agent 104 and the service provider 106, and further comprises a community 308 of other end users.

The end user 102 sets, at 122, user preferences 412, which may be stored on the user's device or platform in a computer readable storage medium. The user agent 104 intercepts, at 124, a service request from the end user 102 to the service provider 106. In response to the service request, the user agent 104 retrieves, at 126, from a storage, the list 412 of user preferences of the end user 102 for privacy and disclosure on a communication network. In response to the service request, the user agent 104 also retrieves, at 626, from the storage, a list 609 of group preferences of the community 308 associated with the end user 104 for privacy and disclosure on the communication network. The community preferences 609 is similar to the community preferences 309 but include cookies.

The user agent 104 modifies the user preferences 412 based on the community preferences 609 to generate a user preferences list 612 (also references to herein as "user preferences 612"). The user agent 104 provides, at 628, the service request of the end user 102 and the user preferences list 612 to the service provider 106 if the service provider 106 is to process the user preferences 612. In this case, the service provider 106 processes the user preferences 612 and determines whether to accept or reject the user preferences. The user preferences 612 is the user preferences 412 modified by the community preferences 609. The service provider 106 provides, at 630, to the user agent 104 a service response acknowledging the acceptance or rejection of the user preferences 612 or a disclosure manifest 416 or both if the service provider 106 processes the user preferences 612. The service provider 106 provides, at 630, to the user agent 104 the disclosure manifest 416 if the service provider 106 does not process the user preferences 612. The user agent 104 validates, at 632, the user preferences 612 and the disclosure manifest 416. The user agent 104 validates by also enforcing the user preferences 612 based on the cookie requirements of the end user 102 and the cookie requirements of the service provider 106. The user agent 104 provides, at 434, to the end user 102 the service response of the service provider 106, actions taken by the user agent 104 based on the validation, and the acknowledgement of the service provider 106.

Figure 7:
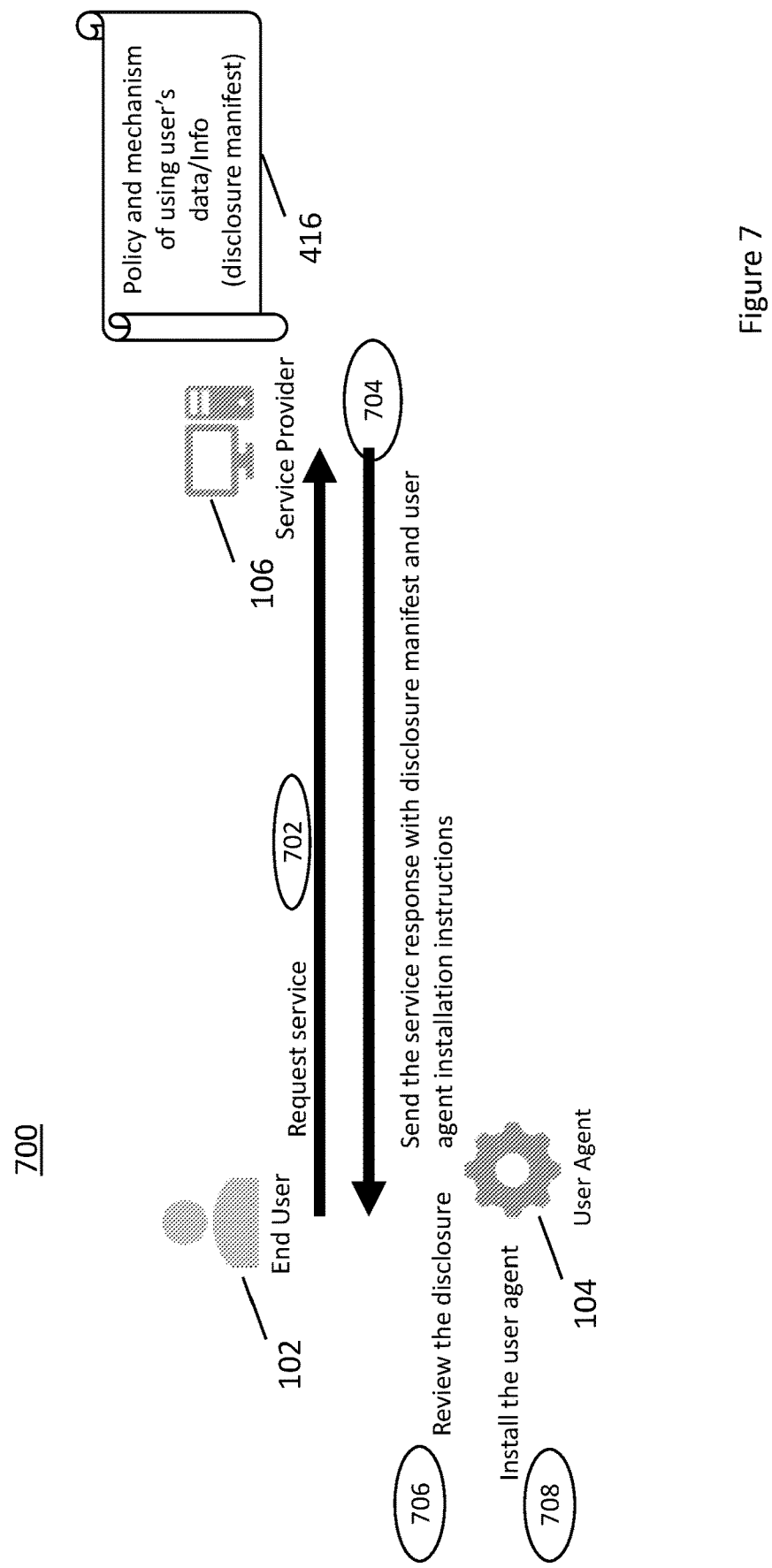
FIG. 7 is a block diagram illustrating a privacy control system according to one embodiment.

FIG. 7 is a block diagram illustrating a privacy control system 700 that deploys a user agent 104 according to one embodiment. The privacy control system 700 comprises the end user system 102, the user agent 104 and the service provider 106. The privacy control systems described above in conjunction with FIGS. 1-6 comprise a user agent 104 installed on a platform of the end user 102. The end user 102 may download the user agent 104 from a service provider 106. Some end users 102 may be unaware of the existence of the user agent 104. The privacy control system 700 provides a process for the end user 102 to download the user agent 104 based on a prompt from the service provider 106. The end user 102 requests, at 702, a service from the service provider 106. In response thereto, the service provider 106 provides, at 704, a service response, a disclosure manifest (such as a disclosure manifest described above), and a request for the end user 102 to a download of the user agent to the system of the end user. The service provider 106 receives, at 706, authorization from the end user 102 to download the user agent 104. The service provider 106 or a delegate, provide, at 708, the user agent 104 to the system of the end user 102 for installation therein. Once an end user 102 has installed the user agent 104, the end user 102 has no need to install the user agent 104 again. The user agent 104 handles updates of itself.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a nontransitory computer readable storage medium of any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Also, as used in the description herein and throughout the claims that follow, the meaning of "on" includes "in" and "on" unless the context clearly dictates otherwise.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method comprising:

intercepting, by a user agent, a service request from an end user to a service provider;

retrieving, by a user agent from a storage, in response to the service request, a list of user preferences of the end user for privacy and disclosure on a communication network, wherein the user agent is downloaded by the end user from the service provider in response to the service provider prompting a request for the end user to a download of the user agent to a system of the end user, the user agent controlling the user preferences;

providing, by the user agent, the service request of the end user and the list of user preferences to the service provider in response to the service provider determining to process the user preferences;

receiving a service response, by the user agent from the service provider, acknowledging acceptance or rejection of the user preferences and a disclosure manifest when the service provider processes the user preferences;

receiving only the disclosure manifest, by the user agent from the service provider when the service provider does not process the user preferences;

validating, by the user agent, the user preferences and the disclosure manifest; and providing, by the user agent to the end user, the service response of the service provider, actions taken by the user agent based on the validation, and an acknowledgement of the service provider.

2. The method of claim 1, further comprising:

retrieving, from the storage, a list of organization preferences of an organization associated with the end user for privacy and disclosure on the communication network; and providing the list of organization preferences to the service provider, wherein the service response acknowledging the acceptance or rejection of the user preferences or a disclosure manifest or both includes acknowledging the acceptance or rejection of the organization preferences, and wherein validating the user preferences and the disclosure manifest includes validating the organization preferences.

3. The method of claim 1, wherein the list of user preferences is based on preferences of a group of other end users for privacy and disclosure on the communication network and selected by the end user.

4. The method of claim 1, wherein the list of user preferences includes cookie preferences, wherein the disclosure manifest includes cookie requirements of the service provider, wherein validating the user preferences and the disclosure manifest includes enforcing the user preferences based on the cookie requirements of the end user and the cookie requirements of the service provider.

5. The method of claim 2, wherein the list of user preferences includes cookie preferences of the end user, wherein the list of organization preferences includes cookie preferences of the organization, wherein the disclosure manifest includes cookie requirements of the service provider, wherein validating the user preferences and the disclosure manifest includes enforcing the user preferences based on the cookie requirements of the end user, the cookie requirements of the organization, and the cookie requirements of the service provider.

6. The method of claim 3, wherein the list of user preferences includes cookie preferences of the end user, wherein the list of group preferences includes cookie preferences of the other group, wherein the disclosure manifest includes cookie requirements of the service provider, wherein validating the user preferences and the disclosure manifest includes enforcing the user preferences based on the cookie requirements of the end user, the cookie requirements of the other group, and the cookie requirements of the service provider.

7. The method of claim 1, further comprising:

receiving, by the service provider, authorization from the end user to download the user agent; and providing the user agent to the system of the end user for installation thereof.

8. A system comprising:

a memory storing computer-executable instructions; and a processor executing the computer-executable instructions to perform:

intercepting, by a user agent, a service request from an end user to a service provider;

retrieving, by a user agent from a storage, in response to the service request, a list of user preferences of the end user for privacy and disclosure on a communication network, wherein the user agent is downloaded by the end user from the service provider in response to the service provider prompting a request for the end user to a download of the user agent to a system of the end user, the user agent controlling the user preferences;

providing, by the user agent, the service request of the end user and the list of user preferences to the service provider in response to the service provider determining to process the user preferences;

receiving a service response, by the user agent from the service provider, acknowledging acceptance or rejection of the user preferences or and a disclosure manifest when the service provider processes the user preferences;

receiving only the disclosure manifest, by the user agent from the service provider when the service provider does not process the user preferences;

validating, by the user agent, the user preferences and the disclosure manifest; and providing, by the user agent to the end user, the service response of the service provider, actions taken by the user agent based on the validation, and an acknowledgement of the service provider.

9. The system of claim 8, further comprising instructions that, when executed, cause an application to perform:

retrieving, from the storage, a list of organization preferences of an organization associated with the end user for privacy and disclosure on the communication network; and providing the list of organization preferences to the service provider, wherein the service response acknowledging the acceptance or rejection of the user preferences or a disclosure manifest or both includes acknowledging the acceptance or rejection of the organization preferences, and wherein validating the user preferences and the disclosure manifest includes validating the organization preferences.

10. The system of claim 8, wherein the list of user preferences is based on preferences of a group of other end users for privacy and disclosure on the communication network and selected by the end user.

11. The system of claim 8, wherein the list of user preferences includes cookie preferences, wherein the disclosure manifest includes cookie requirements of the service provider, wherein validating the user preferences and the disclosure manifest includes enforcing the user preferences based on the cookie requirements of the end user and the cookie requirements of the service provider.

12. The system of claim 8, wherein the list of user preferences includes cookie preferences of the end user, wherein the list of organization preferences includes cookie preferences of the organization, wherein the disclosure manifest includes cookie requirements of the service provider, wherein validating the user preferences and the disclosure manifest includes enforcing the user preferences based on the cookie requirements of the end user, the cookie requirements of the organization, and the cookie requirements of the service provider.

13. The system of claim 8, wherein the list of user preferences includes cookie preferences of the end user, wherein the list of group preferences includes cookie preferences of the other group, wherein the disclosure manifest includes cookie requirements of the service provider, wherein validating the user preferences and the disclosure manifest includes enforcing the user preferences based on the cookie requirements of the end user, the cookie requirements of the other group, and the cookie requirements of the service provider.

14. The system of claim 8, further comprising instructions, that, when executed, cause an application to perform:

receiving, by the service provider, authorization from the end user to download the user agent; and providing the user agent to the system of the end user for installation thereof.

15. A non-transitory computer readable storage medium comprising instructions, that, when executed, cause an application to perform:

intercepting, by a user agent, a service request from an end user to a service provider;

retrieving, by a user agent from a storage, in response to the service request, a list of user preferences of the end user for privacy and disclosure on a communication network, wherein the user agent is downloaded by the end user from the service provider in response to the service provider prompting a request for the end user to a download of the user agent to a system of the end user, the user agent controlling the user preferences;

providing, by the user agent, the service request of the end user and the list of user preferences to the service provider in response to the service provider determining to process the user preferences;

receiving a service response, by the user agent from the service provider, acknowledging acceptance or rejection of the user preferences or and a disclosure manifest when the service provider processes the user preferences;

receiving only the disclosure manifest, by the user agent from the service provider when the service provider does not process the user preferences;

validating, by the user agent, the user preferences and the disclosure manifest; and providing, by the user agent to the end user, the service response of the service provider, actions taken by the user agent based on the validation, and an acknowledgement of the service provider.

16. The non-transitory computer readable storage medium of claim 15, further comprising instructions, that, when executed, cause an application to perform:

retrieving, from the storage, a list of organization preferences of an organization associated with the end user for privacy and disclosure on the communication network; and providing the list of organization preferences to the service provider, wherein the service response acknowledging the acceptance or rejection of the user preferences or a disclosure manifest or both includes acknowledging the acceptance or rejection of the organization preferences, and wherein validating the user preferences and the disclosure manifest includes validating the organization preferences.

17. The non-transitory computer readable storage medium of claim 15, wherein the list of user preferences is based on preferences of a group of other end users for privacy and disclosure on the communication network and selected by the end user.

18. The non-transitory computer readable storage medium of claim 15, wherein the list of user preferences includes cookie preferences, wherein the disclosure manifest includes cookie requirements of the service provider, wherein validating the user preferences and the disclosure manifest includes enforcing the user preferences based on the cookie requirements of the end user and the cookie requirements of the service provider.

19. The non-transitory computer readable storage medium of claim 15, wherein the list of user preferences includes cookie preferences of the end user, wherein the list of organization preferences includes cookie preferences of the organization, wherein the disclosure manifest includes cookie requirements of the service provider, wherein validating the user preferences and the disclosure manifest includes enforcing the user preferences based on the cookie requirements of the end user, the cookie requirements of the organization, and the cookie requirements of the service provider.

20. The non-transitory computer readable storage medium of claim 15, wherein the list of user preferences includes cookie preferences of the end user, wherein the list of group preferences includes cookie preferences of the other group, wherein the disclosure manifest includes cookie requirements of the service provider, wherein validating the user preferences and the disclosure manifest includes enforcing the user preferences based on the cookie requirements of the end user, the cookie requirements of the other group, and the cookie requirements of the service provider.

21. The non-transitory computer readable storage medium of claim 15, further comprising instructions, that, when executed, cause an application to perform:

receiving, by the service provider, authorization from the end user to download the user agent; and providing the user agent to the system of the end user for installation thereof.

* * * * *